United States Patent
Mestieri et al.

(10) Patent No.: US 10,823,878 B2
(45) Date of Patent: Nov. 3, 2020

(54) OPTOELECTRONIC SENSOR AND METHOD OF OPERATION OF AN OPTOELECTRONIC SENSOR COMPRISING AN AMPLIFIER TO CANCEL CONTRIBUTIONS OF LOW FREQUENCY COMPONENTS OF CURRENT SIGNAL FROM A PHOTODETECTOR

(71) Applicant: Datalogic IP Tech S.R.L., Calderara di Reno, Bologna (IT)

(72) Inventors: Marco Mestieri, Ferrara (IT); Paolo Tosato, Bologna (IT); Alberto Fabbri, Bologna (IT); Andrea Locarni, Bologna (IT); Danilo Naldi, Bologna (IT)

(73) Assignee: Datalogic IP Tech S.R.L., Calderara di Reno, Bologna (IT)

( * ) Notice: Subject to any disclaimer, the term of this patent is extended or adjusted under 35 U.S.C. 154(b) by 281 days.

(21) Appl. No.: 15/764,838

(22) PCT Filed: Sep. 30, 2016

(86) PCT No.: PCT/IB2016/055861
§ 371 (c)(1),
(2) Date: Jan. 29, 2019

(87) PCT Pub. No.: WO2017/056047
PCT Pub. Date: Apr. 6, 2017

(65) Prior Publication Data
US 2019/0162874 A1 May 30, 2019

(30) Foreign Application Priority Data
Oct. 1, 2015 (IT) .............................. UB2015A4173

(51) Int. Cl.
*G01S 7/48* (2006.01)
*G01V 8/12* (2006.01)
(Continued)

(52) U.S. Cl.
CPC .............. *G01V 8/12* (2013.01); *G01S 7/4861* (2013.01); *G01S 7/4868* (2013.01);
(Continued)

(58) Field of Classification Search
CPC ...... G01S 17/04; G01S 7/4861; G01S 7/4876; G01V 8/12
(Continued)

(56) References Cited

U.S. PATENT DOCUMENTS

| | | |
|---|---|---|
| 5,357,331 A | 10/1994 | Flockencier |
| 5,508,510 A | 4/1996 | Laverty, Jr. et al. |

(Continued)

FOREIGN PATENT DOCUMENTS

| | | |
|---|---|---|
| DE | 10125307 A1 | 8/2002 |
| DE | 20023943 U1 | 4/2008 |

(Continued)

OTHER PUBLICATIONS

Italian Search Report corresponding to Italian Application No. IT UB20154173, dated Jun. 8, 2016, 12 pages.

*Primary Examiner* — Que Tan Le
(74) *Attorney, Agent, or Firm* — Foley & Lardner LLP

(57) ABSTRACT

The present invention relates to an electronic sensor and a method of measurement with such sensor. The sensor includes an emitter arranged for emitting an electromagnetic, preferably a pulsed radiation, and a receiver arranged for receiving said electromagnetic radiation and transforming it into an electric signal.

20 Claims, 9 Drawing Sheets

(51) Int. Cl.
    *G01S 7/4861* (2020.01)
    *G01S 7/487* (2006.01)
    *G01S 7/486* (2020.01)
    *G01V 8/10* (2006.01)
    *G01S 17/04* (2020.01)

(52) U.S. Cl.
    CPC ............ *G01S 7/4876* (2013.01); *G01S 17/04* (2020.01); *G01V 8/10* (2013.01)

(58) Field of Classification Search
    USPC .................................. 250/214 A, 214 R, 221
    See application file for complete search history.

(56) References Cited

U.S. PATENT DOCUMENTS

| | | | |
|---|---|---|---|
| 5,714,909 A * | 2/1998 | Jackson | ............. H03F 3/082 250/214 A |
| 6,229,301 B1 | 5/2001 | Bolli et al. | |
| 7,012,237 B1 | 3/2006 | Ake | |
| 7,312,854 B2 | 12/2007 | Sugiyama et al. | |
| 7,486,386 B1 | 2/2009 | Holcombe et al. | |
| 7,527,205 B2 | 5/2009 | Zhu et al. | |
| 8,354,650 B2 | 1/2013 | Grosholz, Jr. et al. | |
| 8,384,883 B2 | 2/2013 | Heizmann et al. | |
| 2003/0059087 A1 | 3/2003 | Waslowski et al. | |
| 2010/0194595 A1 | 8/2010 | Mimeault et al. | |
| 2011/0301918 A1 | 12/2011 | Haselman et al. | |
| 2012/0307065 A1 | 12/2012 | Mimeault et al. | |
| 2013/0015330 A1 | 1/2013 | Budde et al. | |
| 2014/0293288 A1 | 10/2014 | Antonucci et al. | |

FOREIGN PATENT DOCUMENTS

| | | |
|---|---|---|
| EP | 0098662 A1 | 1/1984 |
| EP | 1209487 A1 | 5/2002 |
| EP | 1876464 B1 | 11/2009 |
| EP | 2348331 B1 | 9/2011 |
| WO | 2014049544 A1 | 4/2014 |

\* cited by examiner

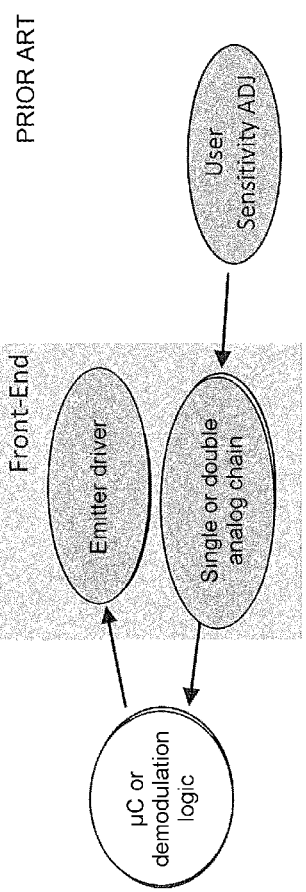
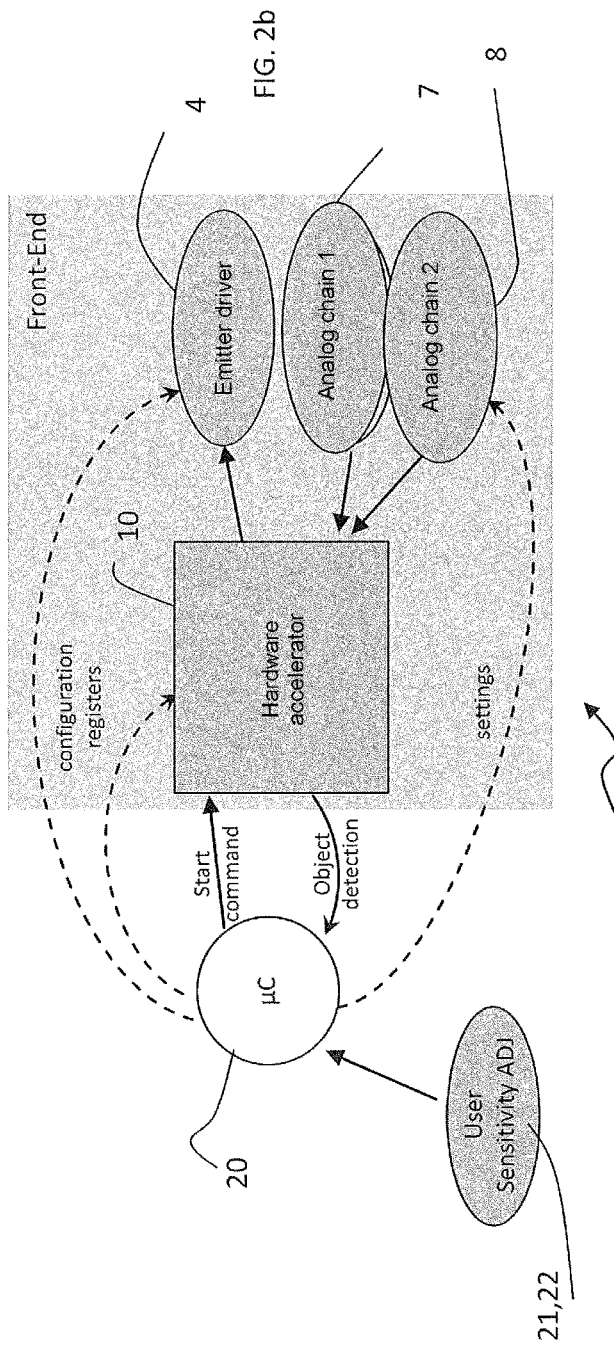

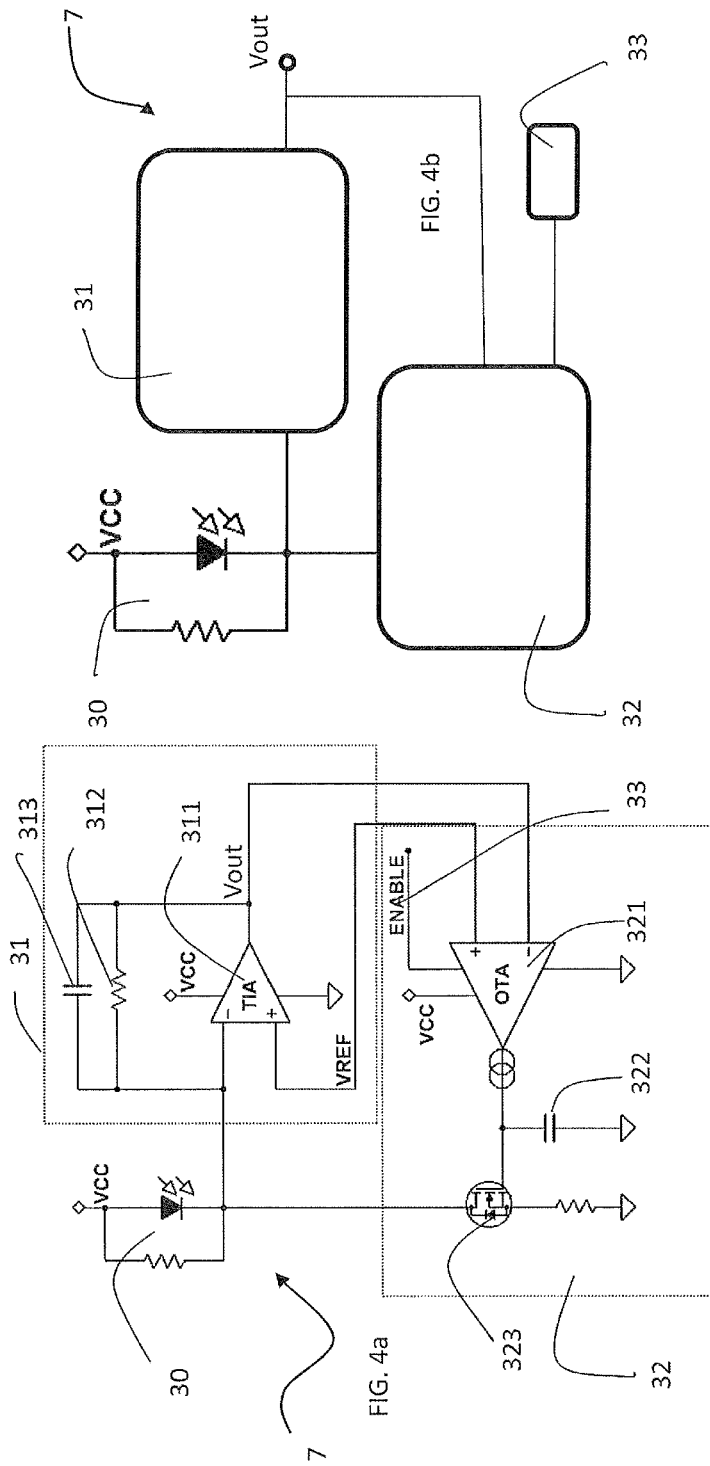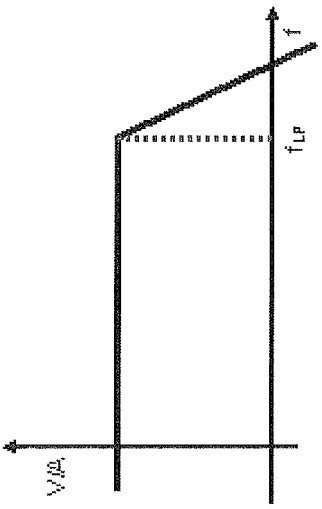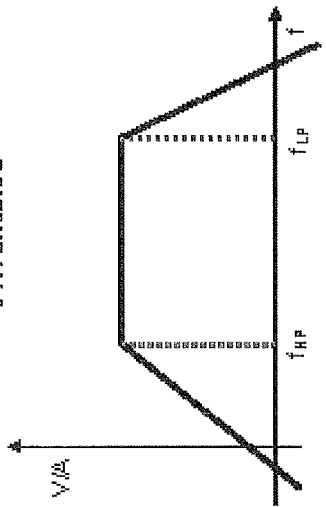

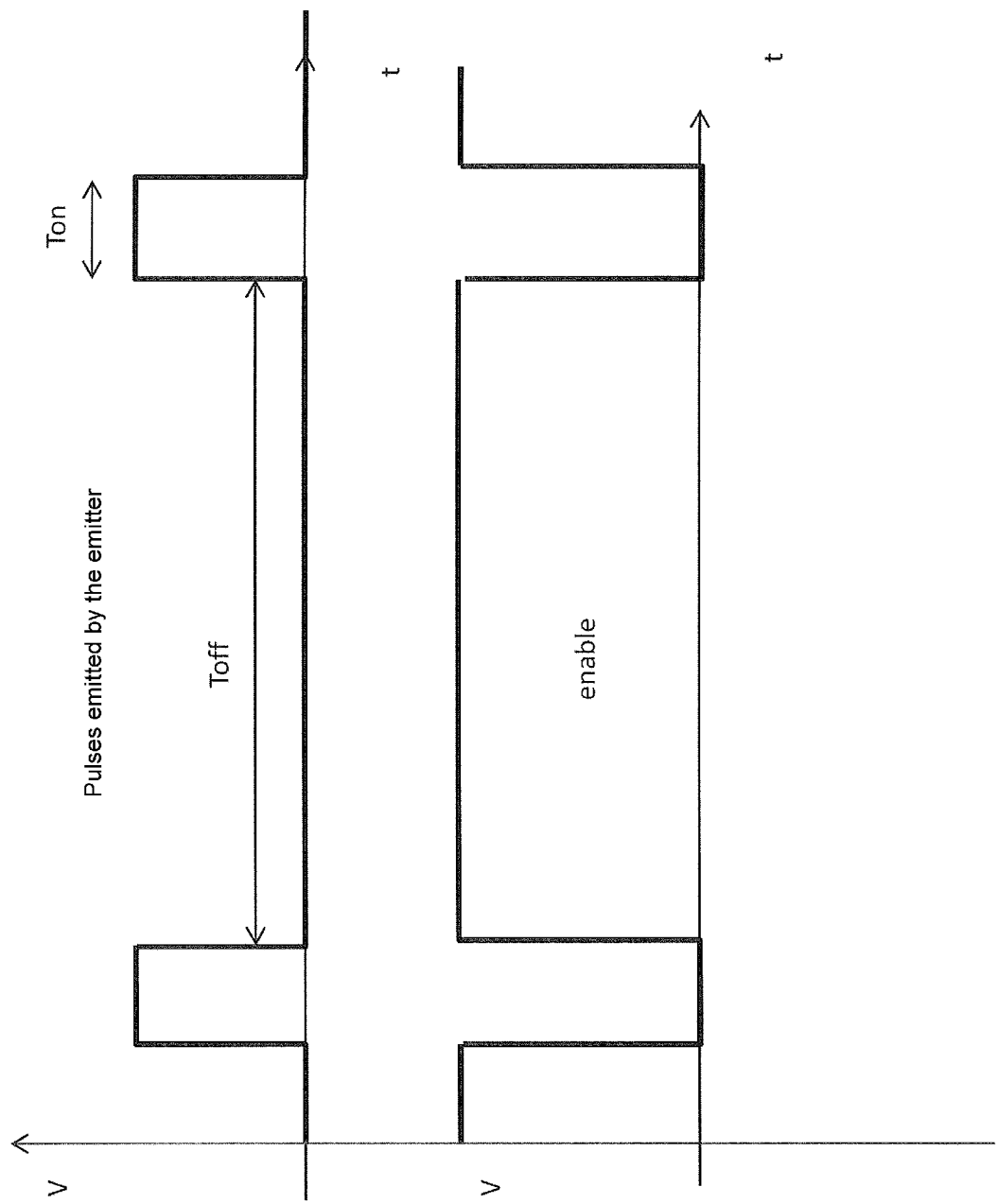

US 10,823,878 B2

OPTOELECTRONIC SENSOR AND METHOD OF OPERATION OF AN OPTOELECTRONIC SENSOR COMPRISING AN AMPLIFIER TO CANCEL CONTRIBUTIONS OF LOW FREQUENCY COMPONENTS OF CURRENT SIGNAL FROM A PHOTODETECTOR

CROSS REFERENCE TO RELATED APPLICATIONS

This application is a 371 National Stage application of International Application No. PCT/IB2016/055861, filed Sep. 30, 2016, which claims priority to UB2015A004173 filed Oct. 1, 2015 in Italy, the contents of which are incorporated herein by reference in their entirety.

TECHNICAL FIELD

The present invention relates to an electronic sensor and operating method of an optoelectronic sensor, preferably, but not exclusively, developed so that the sensor can be used in a plurality of fields of application.

TECHNOLOGY BACKGROUND

Optoelectronic sensors have been used for a long time in the industrial automation industry, in packaging machines or in the food industry for detecting the presence or a characteristic of an object.

There are different types of optoelectronic sensors, each type being specialized in a specific application or for detecting a specific characteristic of an object positioned within a range of operating distances.

The operation of optoelectronic sensors is based on the physical capabilities of the photosensitive elements employed to change their electrical characteristics in relation to the light intensity striking them. The variation in the light intensity of the light source that strikes the receiver element, conditioned by the presence or absence of the object to be detected, or its characteristics, causes the receiver to emit an electric signal. The optoelectronic sensor does not have any physical contact with the object to be detected, which can be of any nature and be removed from a few millimeters to several meters.

A first type of optoelectronic sensor includes different kinds of sensors, such as the diffusion, direct reflection, diffuse or proximity sensor. According to this type, the emitter and receiver are in the same container, together with the electronic controls. The operation is based on the light reflected from any object placed in proximity. The light beam is generated by the emitter, and upon its reflection from an object, is returned to the housing, affecting the receiver.

A second type is denominated as retroreflection or of the reflection type. Its operation is based on the object blocking the light beam and in this version the light beam generated by the emitter is reflected by a prism reflector (with the characteristic of reflecting the incident light in parallel) towards the receiver. Even in this case the emitter and receiver are in the same container, together with the electronic controls.

The third type of optoelectronic sensors is referred to as barrier sensor and is also based on the principle of blocking the beam of light. However, in this type of sensor, the emitter and receiver are separated in different containers, so that the light beam is directed from the emitter to the receiver.

Regardless of the type, an optoelectronic sensor is therefore provided with at least an emitter suitable for emitting electromagnetic radiation and a receiver suitable for receiving the electromagnetic radiation that was emitted, whether diffused, refracted, or transmitted. The emitted radiation generally includes a pulse or a pulse train having a relatively brief duration with respect to the period when no electromagnetic radiation is transmitted. The reception of the pulse and its subsequent processing determine the detection of the characteristic of interest, that is to say the lack of reception of one or more pulses determines the presence of an object between emitter and detector. This is true for asynchronous sensors (separate emitter and receiver) and for models that utilize a reflector, because in both cases the receiver is exposed to the reference (the emitter in the asynchronous case and the reflector in the retro-reflex case) when no object is present inside the detection range. On the other hand, diffusion models are exposed to the emitter only when the latter impinges on the target and the radiation is diffused. In this case, the received signal means that the target is present.

Given the number of optoelectronic sensors, and the different requirements they must meet, from the necessary gain for detecting a signal in the number of included photodetectors, it is often necessary to develop a plurality of electronic circuits, each for a different type of sensor, in order to address the specific requirements of every particular type of sensor. Having a circuit implemented specifically for only one sensor imposes a certain rigidity in the signal processing, as well as a large number of different components to be implemented.

Nonetheless implementing a single circuit that can be applied to all the sensors present is equally complex, since if said circuit is developed by means of analog electronics, there will be many blocks that are not utilized in certain applications. Furthermore, the overall architecture is particularly complex, increasing the production costs in the process. Not least, the space dimensions available for the control and signal processing circuits are relatively modest and therefore an analog circuit that includes all the necessary components for operating under all the above-illustrated conditions would be excessively bulky. On the other hand 'just digital' solutions are compact, flexible in operation, but do not allow the operating distances and frequencies of completely analog sensors to be achieved.

It is therefore desirable to be provided with an electronic circuit embodying a "front-end" for an electronic sensor that is applicable to the greatest number of sensors present in the market while permitting to have at the same time high sensitivity, be flexible, be relatively small, and have relatively contained costs.

This aspect is particularly evident in sensors that need two photo diodes, such as background cancellation sensors, or which include a PSD sensor such as in position sensors, which therefore generate at least two current signals. Every current signal is connected to an amplifier chain that is suitable for amplifying the respective signal. In the prior art, and in particular in analog electronics, a differential function is utilized, since the difference between the signals contains the information related to the position of the object. However, in order to obtain the best performance, a summer to sum the two signals and a divisor to calculate the ratio between the previously obtained difference and sum are also necessary. In any event, this architecture is extremely complex, is not flexible, and requires a lot of space. Alternatively, the signals could be sent directly to a microcontroller, without performing all the above indicated operations in the analog domain; however the mathematical computations necessary for obtaining the required values in the standard low cost microcontrollers utilized in these applications would require an excessive amount of time, thus limiting the maximum operating frequency of the sensor.

Another aspect to be considered in optoelectronic sensors is the need for noise cancellation. Many noise sources that can be present close to the receiver and which may alter the response of the sensor to a signal emitted by the emitter are sources of a signal with generally low or DC frequency, such as for example halogen lamps and solar radiation. Standard sensors in the prior art separate the alternating component of the received signal from the DC signal that derives from interference with different sources present in the environment other than the emitter. This decoupling solves some problems, but it poses others which are difficult to solve. In particular when this decoupling is carried out, it is complex to determine the maximum value of the received signal, as well as synchronizing the emitter and the receiver, in particular if the received signal is subsequently processed in an A/D converter. Furthermore, in case of emission of pulse trains by the emitter, it is very difficult to determine the value of the amplitude of a high frequency train, because the average amplitude value of the received signal is equal to zero. In general this imposes, for example, increasing the temporal interval present between the two pulses in the same train.

Moreover, it is known in the art that the sensitivity of an optoelectronic sensor defines the intensity of the received optical signal at which the sensor "detects" an object or characteristic thereof. In many applications, the sensitivity of the sensor is regulated in relation to the field of application, for example by means of a trimmer. The user requires to be able to adjust the sensitivity "without steps or jumps", in order to select the operating distance of the sensor or the sensitivity of the sensor in the best manner. Furthermore, in some applications the sensitivity must be modified within a very wide range.

In order to meet this requirement, the optoelectronic sensor is generally provided with an amplification stage inside the receiver suitable for receiving an electric signal generated by the reception of electromagnetic radiation and provided with variable gain. This gain is regulated by the user by selecting a sensitivity of the sensor, for example in relation to the working distance (that is to say a distance between emitter and receiver or a distance within which the detection of an object is desired), for example by means of a regulation element which in turn determines the corresponding gain of the amplification stage. In general this variable gain is obtained by means of a set of gain resistors, one for each gain step, so that in order to obtain a "substantially continuous" wide dynamic range, a vast plurality of resistors and switches are necessary, which make the circuit complex and limit its bandwidth and signal to noise ratio.

Furthermore, if the current electric signal generated by the photodetector as a result of the received electromagnetic radiation is transformed into a voltage signal by means of a transimpedance amplifier, an additional possibility for varying the sensitivity of the sensor is to change the bias current of the transimpedance amplifier. This appears to be a simple solution to implement, but such regulation may considerably increase the noise throughout the entire amplification stage.

An additional possibility for varying the sensitivity of the sensor is to modify the amplitude of the output signal from the emitter, for example by varying the emission current. However, this variation may also imply problems. First of all a variation of the emission current signifies a visible variation of the beam emitted by the emitter (if the sensor emits in the visible spectrum), which is not particularly desirable by the user. Furthermore, this regulation requires an accurate and precise control of the emission current and its timing, which increase the complexity of the electronic circuit.

SUMMARY OF THE INVENTION

The present invention provides a sensor and a method for operating said sensor, or parts thereof, which solves at least one of the above presented problems in relation with the prior art.

In a first aspect, the invention relates to an optoelectronic sensor that comprises:
  an emitter arranged for emitting electromagnetic radiation;
  a receiver arranged for receiving electromagnetic radiation, said receiver comprising:
    one or more photodetectors arranged for receiving electromagnetic radiation and transforming it into a first and/or a second electric signal;
    a first and a second amplifier, arranged for independently amplifying said first and/or said second signal, so as to generate a first and/or a second amplified signal, wherein said first amplified signal is independent from said second amplified signal, and vice-versa;
    an analog/digital converter arranged for receiving said first and/or said second amplified signal in a first and a second input, respectively, and providing a first and/or a second digital signal;
    a hardware accelerator configured to receive said first and/or second digital signal and process said first and/or second digital signal performing a mathematical function on one of them or between them, in order to generate a processed signal; and
    a processor arranged for receiving said processed signal from said hardware accelerator.

The optoelectronic sensor of the invention is any type of optoelectronic sensor suitable for detecting objects or the characteristics of objects. It can be for example a diffusion sensor, where the sensor responds to any object that reflects light; a retroreflection sensor, where the sensor only responds to light reflected from a well determined surface called the reflector; or a through-beam sensor, where the sensor responds to any interruption of the light flux.

The sensor in the invention is for example a position sensor where two photodetectors or a Positioning Sensing Detector (PSD) are utilized to determine the position of an object by means of triangulation.

The emitter can be of any type, for example including a solid state polychromatic device (non coherent emission). Alternatively, it can include a laser. Preferably, the emitter includes a LED (Light Emitting Diode), for example with emission in the visible or infrared or ultraviolet band. The emitter is arranged for emitting an electromagnetic radiation, for example, preferably but not necessarily, a pulsed radiation. Pulsed radiation means that the emitter emits electromagnetic radiation different from zero for a "brief" time interval $T_{on}$, and equal to zero otherwise. During time interval $T_{on}$ a plurality of pulses can also be present; that is to say, a pulse train with overall duration of $T_{on}$ could be sent from the emitter. In this case, during time interval $T_{on}$ there are sub-intervals in which the signal has amplitude equal to 0, or much less than the maximum signal amplitude, where these intervals are the distance between the many pulses in the same train. The electromagnetic radiation overall emitted by the emitter is preferably periodic.

The receiver preferably comprises one or more photodetectors such as photodiodes or photoresistors, which are devices sensitive to a very wide spectrum of frequencies. The receiver is capable of transforming electromagnetic radiation into an electric signal. Therefore, upon its detection, the received electromagnetic radiation is transformed into an electric signal that is then conveniently processed as indicated hereinafter. In other words, the photodetector converts a light signal into an electric signal, usually a current that is then converted into voltage by the electronics. There exist photodetectors that exploit different physical principles. Preferably a photodiode is utilized.

The architecture implemented in the sensor of the invention substantially includes a "front-end" for one or two photodetectors, the output signal of which is first amplified in the analog domain and is then processed digitally. The photodetectors transform the electromagnetic radiation that strikes them into an electric signal. Therefore three types of configuration are possible: only one photodetector generating a single current signal can be present, there can be two photodetectors generating two current signals, or there can be a PSD type photodetector generating more than one current signal, for example a first and a second such signal. Both the configuration, in which two current signals are generated, and the configuration with a single signal are preferred, because it is desired that the present circuit configuration of the sensor be "multi-purpose", that is to say that it is preferable that this sensor architecture be configurable for more sensors that can be applied in different applications, including those that require a single photodetector generating a single current signal in response to the received electromagnetic radiation.

The analog component, substantially comprising a first and a second analog chain, is particularly simplified in the present solution, in particular because they do not perform mathematical operations such as the sum, subtraction or division of the two signals, so that the corresponding elements are absent. There is no "cooperation" between the two chains, so that each amplification chain amplifies its own input signal. The two signals in the two chains remain independent and are not correlated. In other words, the first amplified signal at the output of the first amplification chain is independent of the second; and the second amplified signal at the output of the second amplification chain is independent of the first. In case a single photodetector generating a single current signal is present, obviously a single electric signal is generated and only one of the two amplification chains is operating.

The first and second amplified signals are brought as inputs to an analog/digital converter in order to create a first and second digital signal. These two signals are subsequently processed digitally by a hardware accelerator.

The possibility of having a hardware accelerator, which is just a separate processor from the main processor, allows the fast detection of the signal in the sensor of the invention and equally fast processing.

The sensor of the invention also includes a processor, but there preferably is a substantial "division of tasks" between the processor and the hardware accelerator precisely in order to increase the response speed of the sensor itself. The main processor, which is generally a microcontroller, is preferably tasked with managing the configuration parameters of the peripheral equipment, while the hardware accelerator is preferably tasked with managing the detection and related logic operations thereto. For example the hardware accelerator can also manage the synchronization of the emission of the pulse in synchronous sensors, for example by including a synchronization clock. Therefore, even if the processor is chosen from the range of relatively inexpensive processors in order to limit the overall cost of the sensor, it is not overloaded or slowed down by the mathematical computation needed in the detection.

In this manner it is possible to perform a fast and accurate detection with an "expendable" architecture in a plurality of different fields of application.

Preferably, said first and/or second amplifier is/are provided with variable gain.

As previously stated, it is preferable that the proposed architecture be applicable to sensors devised for several fields of application. The various fields of application also include those in which it is necessary to manage widely different detection distances, from a few centimeters to tens of meters. In order to obtain the desired sensitivity at all these distances with the same sensor, it is preferred that the amplifiers be provided with variable gain, thus varying the sensitivity of the sensor in relation to the operating distance.

More preferably, the sensor of the invention includes a regulation element for the variable gain of said first and/or second amplifier, wherein said regulation element is connected to said processor, wherein said processor is arranged for sending a control signal to said first and/or second amplifier in relation to a value selected in said regulation element.

Hence the gain of the amplifiers, or amplifier, can be modified by means of the regulation element, for example in relation to the distance between the emitter and receiver. Alternatively, in synchronous sensors the intensity of the signal that can be detected in the application can be modified by changing the gain. Furthermore, by simply modifying the software in the processor, i.e. the regulation firmware, it is possible to utilize the sensor in one application or another that require different regulation, without modifying the proposed architecture.

Preferably, said processed signal is a signal indicating the detection of an object.

As previously stated, the hardware accelerator is preferably tasked with all the activities in connection with the detection phase, with the consequent mathematical operations to be performed on the signals deriving from the amplification chains. Processing is relatively fast since it is managed by means of dedicated digital logic. The hardware accelerator preferably processes the sampled values of the received signal and provides the processor with various information including:

the processed values,
the outcome of the detection,
other information in connection with the amplitude of the received signal,
information about the presence of disturbances coupled into the desired signal.

Advantageously, said hardware accelerator is configured to process said first and/or said second digital signal. In general, it is known that the decision phase about the presence or lack thereof of an object is carried out by comparing a signal received by the receiver with one or more thresholds. Preferably, the operations in connection with the detection phase are carried out by the hardware accelerator.

In an embodiment, the optoelectronic sensor of the invention includes a driver for emitting a current signal in order to generate said pulsed electromagnetic radiation by said emitter, said driver being controlled by said hardware accelerator.

For example, it is possible to change the amplitude of the signal emitted by the emitter. Hence also in this case, by means of a simple software variation, it is possible to adapt the sensor to fields of application that require various different pulses.

Advantageously, said first and second amplifier, said analog/digital converter, said hardware accelerator, and said processor are implemented in the same integrated circuit. More preferably, the integrated circuit is an ASIC (application-specific integrated circuit).

By means of a single integrated circuit for different applications, the components of the electronic circuit are all integrated therein, so that assembling the sensors is as simple as possible, while the number of elements is quite reduced, even for very different sensors.

In a second aspect, the invention relates to an optoelectronic sensor that comprises:
- an emitter suitable for emitting pulsed electromagnetic radiation;
- a receiver suitable for receiving electromagnetic radiation, said receiver comprising:
  - a photodetector arranged for receiving said electromagnetic radiation and transforming it into an electric current signal;
  - an amplifier, receiving the current signal at its input and emitting a voltage signal at its output, wherein said amplifier comprises:
    - a first stage with the current signal as its input and configured to convert the current signal into a voltage signal and provide the voltage signal on an output, wherein said output is the output of the amplifier;
    - a second feedback stage, arranged for receiving the voltage signal output from said first stage at its input, and for providing a feedback current signal as an output as a function of the voltage signal at the output of the first stage and arranged for summing to the current signal of the photodetector introduced into the first stage in order to cancel from the voltage signal at the output of the first stage the contributions of the low frequency components of the current signal of the photodetector; and
    - a commutator connected to said second stage arranged for activating or not said second stage, which can be moved into an activation configuration, in which said second stage emits said feedback current, and into a non-activation configuration, in which said second stage emits a substantially constant current.

The optoelectronic sensor of the invention is any type of optoelectronic sensor arranged for detecting objects or the characteristics of objects. It can be for example a diffusion sensor, where the sensor responds to any object that reflects light; a retroreflection sensor, where the sensor only responds to light reflected from a well determined surface called the reflector; or a through-beam sensor, where the sensor responds to any interruption of the light flux.

The emitter can be of any type, for example including a solid state polychromatic device (non coherent emission). Alternatively it can include a laser. Preferably, the emitter includes an LED (Light Emitting Diode), for example with emission in the visible or infrared band. The emitter is arranged for emitting electromagnetic radiation, and preferably pulsed electromagnetic radiation. Pulsed radiation means that the emitter emits electromagnetic radiation different from zero for a "brief" time interval $T_{on}$, and equal to zero otherwise. During time interval $T_{on}$ a plurality of pulses can also be present; that is to say, a pulse train with overall duration of $T_{on}$ could be sent from the emitter. In this case, during time interval $T_{on}$ there are sub-intervals in which the signal has amplitude equal to 0, or much less than the maximum signal amplitude, where these intervals are the distance between the many pulses in the same train. Preferably, the pulses in the same train are periodic themselves, that is to say the distance between the pulses in the same train is the same for all train pulses. The overall electromagnetic radiation emitted by the emitter is preferably periodic, with period $T=T_{on}+T_{off}$ where a time interval equal to a $T_{off}$ is present between two separate pulses or between two successive pulse trains.

The receiver preferably comprises a photodetector such as photodiodes or photoresistors, which are devices sensitive to a very wide spectrum of frequencies. The receiver is capable of transforming electromagnetic radiation into an electric signal. Therefore, upon its detection, the received electromagnetic radiation is transformed into an electric signal that is then conveniently processed as indicated hereinafter. In other words, the photodetector converts a light signal into an electric signal. There exist photodetectors that exploit different physical principles. Preferably a photodiode is utilized.

The receiver is usually located in an environment in which the emitter is not the only possible source of electromagnetic radiation. For example, ambient light (from the Sun), halogen, or other lamps are present in the environment surrounding the receiver. Therefore, even when the emitter does not emit any radiation, a signal is received by the receiver and commutated into an electric signal by the photodetector. For example, in a preferred embodiment the photodetector can correspond to a photodiode. As is known in the art, the current response of photodiodes is linear in a wide interval of light radiation, so that the photodiode converts the signal into a current signal.

The receiver hence includes a photodetector arranged for transforming the received electromagnetic radiation into a current signal. In order to be best processed, the current signal deriving from the photodetector is amplified by an amplifier. The amplifier could for example be an amplifier implemented according to the first aspect of the invention or part thereof.

The amplifier includes a first stage, arranged for transforming the current signal received from the photodiode into a voltage signal. When the emitter does not emit any pulse, the current signal and hence the consequent voltage signal is substantially a noise signal, while when a pulse is emitted by the emitter, the current or voltage signal is the superposition of the noise and the signal caused by the pulse.

At the output of the first stage is hence present a voltage signal, which in case there is no emission of an pulse by the emitter, is a pure noise signal, including with high probability DC or low frequency components, arising from the noise sources described above; in case of emission it is instead the superposition of these DC or low frequency components and the signal caused by the pulse. The amplifier hence includes a second stage, which has the function of a feedback stage. On the basis of the voltage output signal, this stage performs feedback; it sends a current signal to the first stage input, in order to ensure that the DC or low frequency components are cut-off, so that the first and second stages substantially operate as a high-pass filter. Thanks to the operation of the second stage, the components caused by the DC or low frequency signal of the current signal deriving from the photodiode are cut-off from the signal at the output of the first stage. In order to implement this function, the second stage emits an output feedback current proportional to the voltage signal at the output of the first stage, which is summed to the current deriving from the photodiode at the input of the first stage. In other words, it can be said that the second stage operates as an integrator, which converts the DC and low frequency components into currents that are utilized as feedback for attenuating components of the current signal cause by noise.

According to the second aspect of the invention, it is possible to commutate the action of the second stage by means of a commutator connected to the second stage. There is a first operating configuration in which this cancellation of the DC component is carried out, as described above, by generating the feedback current as a function of the signal at the output of the first stage, and a second operating configuration in which this cancellation in no longer carried out in a modulated manner and where the current emitted by the second stage is constant. The term constant is not a term utilized in absolute sense, but it should be meant as something that can be assumed to be constant for the present utilization. Therefore the second stage can emit a "modulated" feedback current that depends on the signal at the output of the first stage, or a constant current, independent of the value that the signal at the output of the first stage assumes after the deactivation has taken place.

Preferably, the time interval in which the commutator is in one configuration in which the cancellation is not carried out is much shorter than the time interval in which the cancellation is carried out. The cancellation of the low frequency disturbance signal is optimal if this condition is true.

Substantially, the cancellation of the low frequency signal is still active also when the commutator brings the second stage into the non-activation operating condition, but the value of the cancellation is constant. By definition the low frequency signal that generates the noise changes slowly in time, so that even if the canceled value "is frozen" for brief periods of time during this brief non-activation interval, it is not modified significantly.

The "constant" current emitted during the deactivation does not depend on the instant value of the output signal from the first stage following commutation into the non-activation configuration.

Hence in the activation configuration, the second stage substantially emits a modulated feedback current that depends on the noise, while this current is emitted into the input of the first stage as feedback. Instead in the deactivated condition, it nonetheless emits a current that is injected into the input of the first stage, but said current is not modulated and is maintained constant.

If the commutation repeats, that is to say if the second stage returns to the activation configuration, then the current emitted by the second stage is modulated again as a function of Vout of the first stage.

In this manner it is possible to transition from one configuration to another during the reception of electromagnetic radiation. The Applicant has discovered that a particular commutation sequence improves the shape of the signal received and amplified by the first and the second stages with respect to a configuration in which there is no commutation. The possibility of commutating between these two configurations leads to the following advantages:

if this architecture is utilized together with an analog/digital converter for the purposes of amplification, it is easier to synchronize the sampling in order to find the maximum value of the signal;

if this architecture is utilized with pulse trains emitted by the emitter and in combination with the analog/digital converter, it is possible to reduce the voltage interval of the converter and the dynamic range of the analog chains;

the maximum received signal is increased;

if this architecture is utilized with two or more pulses and with comparators for the purposes of amplification, the demodulation logic is simplified.

These advantages lead to an optoelectronic sensor provided with an improved distance range where it is possible to carry out a measurement.

Preferably, said commutator is configured to be movable into said activation configuration when no electromagnetic radiation is emitted by said emitter.

Advantageously, said commutator is configured to be movable into said non-activation configuration when said emitter emits a pulse of electromagnetic radiation.

The commutation between the activation and the deactivation configuration preferably occurs dynamically in relation to the pulses emitted by the emitter. Therefore the DC and low frequency component is canceled by the second stage when no signal is emitted by the emitter, while a constant current is emitted by the second stage when a signal is emitted by the emitter. This constant current implements in any event a noise cancellation, but its value is not "updated" and is maintained constant. In general the emitter emits periodic pulses with $T_{on} \ll T_{off}$ and therefore the proper operating condition of the described circuit is respected.

Advantageously, said constant current is equal to the feedback current at the instant previous to said emission of said pulse.

In order to avoid distorting the signal received at the output of the amplifier, the signal is maintained constant; that is to say that during the non-activation configuration, a false DC or low frequency component of the signal at the input of the first stage is canceled, which is equal to the last component canceled by the second stage in the activation configuration. In other words, the second stage emits a current signal that does not depend on the output signal from the first stage, but only depends on the last emitted current feedback signal, which is maintained for the time in which the commutator is placed in the non-activation configuration.

Advantageously, the amplifier is implemented by an integrated circuit. An integrated circuit, and more preferably an ASIC, permits the implementation of several functions in a single circuit, and a single element must be assembled in each sensor.

Advantageously, said first stage includes a transimpedance amplifier, wherein said transimpedance amplifier receives the current signal from the photodetector as input and emits the output voltage signal as output. Transimpedance amplifiers are frequently utilized for amplifying a current signal deriving from photodiodes and transforming them into a voltage signal.

More preferably, said second stage includes a transconductance amplifier, wherein said transconductance amplifier receives the output voltage signal of said first stage as input and emits a current signal utilized to generate said feedback current as output.

Preferably, said commutator includes an "enable" signal.

For example, if the second stage comprises a transconductance amplifier, the enable signal can be one of the inputs of the amplifier itself, guaranteeing simple and fast commutation.

According to a third aspect, the invention relates to a method for canceling the noise signal in an optoelectronic sensor, wherein said sensor includes:
- an emitter arranged for emitting electromagnetic radiation;
- a receiver arranged for receiving electromagnetic radiation, said method comprising:
    - receiving electromagnetic radiation and transforming it into a first current signal,
    - when said electromagnetic radiation is received while said emitter is not emitting a pulse signal, then:
        - transforming said current signal into a voltage signal in a first stage;
        - generating a feedback current signal as a function of said voltage signal, and add said feedback current signal to said first current signal and inject the result into the input of said first stage in order to cancel the contributions of the low frequency components of the first current signal in the voltage signal emitted by the first stage;
    - when said electromagnetic radiation is received while said emitter is emitting a pulse signal, then:
        - transforming said current signal into a voltage signal in a first stage;
        - emitting a constant current signal and add said constant current signal to said first current signal and inject the result into the input of said first stage.

More preferably the method includes:
Determining a feedback current before the emission of said pulse;
Emitting said pulse; and
During the emission of said pulse, emitting a constant current signal equal to said measured feedback current and add said constant current signal to said first current signal.

The advantages of the third aspect of the invention were already outlined in reference to the second aspect and will not be repeated here.

According to a fourth aspect, the invention relates to an optoelectronic sensor that comprises:
- a receiver arranged for receiving electromagnetic radiation, wherein the receiver comprises a photodetector arranged for transforming the received electromagnetic radiation into a received electric signal and a variable gain amplification stage with gain between a minimum gain $G_{min}$ and a maximum gain $G_{max}$ arranged for amplifying said received electric signal;
- an emitter arranged for emitting radiation
- a detector circuit arranged for processing said received and amplified electric signal and comparing said received, amplified, and processed electric signal with a detection threshold;
- a regulation element configured for regulating the sensitivity of the sensor having a regulation range subdivided into a number of consecutive zones m, where the first zone corresponds to a sensor sensitivity starting from the minimum usable sensitivity for the optoelectronic sensor, and where the m-th zone corresponds to a sensitivity terminating at the maximum usable sensitivity for the optoelectronic sensor; wherein said gain of said amplifier stage is selected by selecting a point in a zone of said field of regulation of the regulation element; said regulation range being implemented in a manner so that for every point in each zone j of the regulation range, the selected gain is constant and equal to:

$$G_j = \alpha G_{j-1}$$

Where $G_{max} = G_m = \alpha^{m-1} G_1 = \alpha^{m-1} G_1$ and a is a predetermined number greater than zero; wherein said regulation range is configured in a manner that by moving a selection point in said regulation range inside the j-th zone in the direction of the starting point adjacent to the (j−1)-th zone towards the end point adjacent to the (j+1)-th zone, the corresponding detection threshold setting in the detection circuit is moved from the maximum threshold setting to the minimum threshold setting, where the maximum threshold setting is equal to the minimum threshold setting multiplied by the number $\alpha$.

The optoelectronic sensor of the invention is any type of optoelectronic sensor arranged for detecting objects or the characteristics of objects. It can be for example a diffusion sensor, where the sensor responds to any object that reflects light; a retroreflection sensor, where the sensor only responds to light reflected from a well determined surface called the reflector; or a through-beam sensor, where the sensor responds to any interruption of the light flux.

The emitter can be of any type, for example including a solid state polychromatic device (non coherent emission). Alternatively it can include a laser. Preferably, the emitter includes a LED (Light Emitting Diode), for example with emission in the visible or infrared band. The emitter is arranged for emitting an electromagnetic radiation, for example a pulsed radiation. Pulsed radiation means that the emitter emits electromagnetic radiation different from zero for a "brief" time interval $T_{on}$, and equal to zero otherwise. During time interval $T_{on}$ a plurality of pulses can also be present; that is to say, a pulse train with duration of $T_{on}$ could be sent from the emitter. In this case, during time interval $T_{on}$ there are sub-intervals in which the signal has amplitude equal to 0, or much less than the maximum signal amplitude, where these intervals are the distance between the many pulses in the same train. Preferably, the pulses in the same train are periodic themselves, that is to say the distance between the pulses in the same train is the same for all train pulses. The overall electromagnetic radiation emitted by the emitter is preferably periodic, with period $T = T_{on} + T_{off}$ where a time interval equal to a $T_{off}$ is present between two separate pulses.

The receiver preferably comprises a photodetector such as photodiodes or photoresistors, which are devices sensitive to a very wide spectrum of frequencies. The receiver is capable of transforming electromagnetic radiation into an electric signal. Therefore, upon its detection, the received electromagnetic radiation is transformed into an electric signal that is then conveniently processed as indicated hereinafter. In other words, the photodetector converts a light signal into an electric signal, which is usually a voltage. There exist photodetectors that exploit different physical principles. Preferably a photodiode is utilized.

Furthermore, the receiver includes a variable gain amplification stage, starting from a minimum gain $G_{min}$ and up to a maximum gain $G_{max}$. The dynamic range of the sensor is given by the ratio $D = G_{max}/G_{min}$.

The sensitivity of an optoelectronic sensor substantially depends on three parameters: the gain of the amplification stage, the detection threshold, and the power of the radiation emitted by the emitter.

$$\text{Sensitivity} \propto S_{gain} \cdot S_{threshold} \cdot S_{emission}$$

where
$S_{Gain} \propto$ gain G of the analog amplification stage
$S_{Emission} \propto$ amplitude of the emission current generating the emitted electromagnetic radiation $S_{threshold} \propto $ a 1/(detection threshold)

Therefore in order to set a determined sensitivity value, it is possible to modify one or more of the above parameters. The present invention targets the simultaneous variation of two parameters, that is to say the variation of the gain of the amplification stage and the detection threshold value.

The sensitivity of the optoelectronic sensor is regulated, whether by the user or automatically, by means of a regulation element. The regulation element is provided with a field of regulation for regulating the sensitivity from a minimum value setting up to a maximum value setting.

First of all, according to the invention the number of possible resistors, or in any event the different gain values possible in the amplification stage, is reduced with respect to what is available in the prior art, simplifying the amplification circuit and limiting noise.

In fact, the gain G of the amplifier can be selected to be equal to a point inside a plurality of discrete points m from a minimum gain value $G_{min}$ up to a maximum gain value $G_{max}$. Preferably $G_{max}$ is included between 20 and 40 MΩ, while $G_{min}$ is included between 20 and 40 kΩ. Therefore, the gain of the amplification stage can only be set to be equal to one of these m discrete selected points, where each point corresponds to a specific gain value of the amplification stage. The number of points m is chosen to be relatively "small", so that the potential number of resistors is relatively modest.

Each point j of the m has gain equal to:

$$G_j = \alpha G_{j-1}$$

where $G_{max} = G_m = \alpha^{m-1} G_1 = \alpha^{m-1} G_1$ and a is a predetermined number greater than zero.

In case there are more amplification stages corresponding to several photodetectors, or for example corresponding to a PSD type sensor (Position Sensitive Detector), i.e. a sensor sensitive to position, which means that the sensor measures the position of an object by measuring the position of the beam emitted on a surface of the receiver, the same gain G is preferably set for all the amplification stages, i.e. the regulation element sets the gain value for all the different amplification chains in the circuit.

The value of the gain G is set to be equal to one of the values available by means of a regulation element, for example a trimmer. However, any regulation element that is arranged for regulating the gain G of the amplification stage and selecting one of the M possible values can be used. The element can be controlled by the user or also automatically. In general, the regulation element provides a plurality of sensitivity values in the regulation of the sensor, from a minimum sensitivity up to a maximum sensitivity. The sensitivity value can for example correspond to the distance value, or select the sensitivity in certain applications that is equivalent to selecting the distance d out of the possible distances in which the emitter can be placed with respect to the receiver, from a minimum distance $d_{min}$ up to a maximum distance $d_{max}$. In sensors in the prior art with variable gain amplification, in general a greater distance corresponds to a greater gain, while analogously a lower distance corresponds to a lower gain.

Alternatively, in PSD type sensors the selected gain simply sets the sensitivity of the amplifier chains, but does not define the operating distance, which is instead determined by the detection threshold.

According to the invention, the field of regulation of the regulation element is subdivided into a number of consecutive zones m equal to the number of the different values m that the gain of the amplification stage or stages can assume.

The m zones correspond to the same number of sensitivity ranges of the sensor; that is to say, the global sensitivity range is subdivided into m sub-ranges in each of which the gain of the amplification chain is constant. By convention, the first zone is defined as the portion of the regulation range corresponding to a sensitivity starting from the minimum usable sensitivity $s_{min}$ of the optoelectronic sensor up to an intermediate sensitivity $S_{1 intermediate}$, while the last or m-th zone is the portion of the regulation range corresponding to a sensitivity starting from sensitivity $s_{(m-1)intermediate}$ and terminating with the maximum usable sensitivity $s_{max}$ of the optoelectronic sensor. Therefore the generic zone j relates to a sensitivity between $s_{(j-1)intermediate}$ and $S_{j intermediate}$ of the sensor, where $s_{min} \ldots s_j \ldots s_{max}$ is a monotonic rising function. Therefore the user (or automatically) for example selects a point in the regulation range belonging to the first, second, ... j-th ... , m-th zone according to the desired sensitivity value for the sensor.

Each of these zones corresponds to a gain range of the amplification stage of the regulation element. According to the invention, by selecting a point inside each of these zones, the corresponding gain is set to be equal to the constant gain value. By selecting a point in the j-th zone of said field of regulation of the regulation element, the corresponding gain selected in the regulation stage is, for each zone of the regulation range, a constant equal to $$Gj = \alpha G_{j-1}$$

It should be noted that by moving to a contiguous zone, i.e. by moving from the j-th zone to the (j+1)-th zone, the gain undergoes a sudden increase equal to α.

Therefore the field of regulation for the regulation element of the invention, which in the prior art is generally subdivided in a monotonic rising manner from a setting for the minimum distance $s_{min}$ between the emitter and receiver corresponding to the minimum gain $G_{min}$ of the amplification stage up to a setting for the maximum distance $s_{max}$ between the emitter and receiver corresponding to the maximum gain $G_{max}$ of the amplification stage, is subdivided into constant gain zones so that in the transition from one zone to another there is a "jump" in the gain of the amplification stage equal to α.

Inside each zone, the various points of the zone correspond to a regulation of the detection threshold of the detection circuit.

In fact, each zone j of the regulation range corresponds to a sub-regulation range for the threshold. The first extremum of the zone j, adjacent to an extremum of zone j−1, corresponds to the value of the maximum threshold setting, while the value of the second extremum, adjacent to an extremum of zone j+1, corresponds to the value of the minimum threshold setting. It should be pointed out that the threshold is inversely proportional to sensitivity. Therefore moving from a first extremum to a second extremum of zone j, the threshold is moved from a maximum value to a minimum value. This variation occurs according to a monotonic decreasing function. Preferably, the number of points in which it is possible to select the threshold value is "high"; the more points are present (the higher the number), the finer the sensitivity of the sensor can be regulated.

The maximum value of the threshold setting is equal to:

Maximum threshold value=minimum threshold value*α

Therefore, even though there is a gain jump equal to a between one zone and another in the regulation of the regulation element, this loss of gain is "compensated" by the counter-variation in the detection threshold which transitions from a minimum value to a maximum value, where the two minimum and maximum values have a ratio precisely equal to a itself, which is equal to the ratio of the gain increase between one zone and the successive zone. Therefore, for each zone selected in the regulation range, it is possible to select a fixed gain throughout the entire zone and a variable detection threshold transitioning from one extremum of the zone to the other.

With this type of regulation for the regulation range of the gain divided into m zones with a gain jump equal to a between the gain at the extrema touching two adjacent zones of the regulation range, and the corresponding variation of the threshold, it is possible to maintain the sensitivity of the optoelectronic sensor substantially continuously variable, while transitioning from the first extremum of the regulation range in the first zone to the last extremum of the regulation range in the last zone.

The meaning of the detection threshold term depends on the type of sensor utilized.

The gross regulation of the sensitivity of the sensor according to the invention is hence carried out by regulating the gain, while the fine regulation is carried out by regulating the detection threshold.

Preferably, said detection circuit comprises a comparator downstream of said amplification stage, wherein said comparator is arranged for comparing the received and amplified signal with said detection threshold in order to establish whether the object was detected or not.

In some sensors, which in general comprise a single photodetector, such as the sensors for detecting an object between the emitter and the receiver, the sensitivity set with the regulation element substantially corresponds to the distance between the emitter and the receiver. The signal amplified by the amplifier is compared with a detection threshold that represents a "threshold" on the minimum amplitude of the amplified signal. The signal exceeding the threshold in general implies that there was no detection of any object between the receiver and the emitter. Therefore the gain of the amplifier is selected in each zone; and then the threshold is selected. A higher threshold implies that the minimum amplitude of the detected signal must be higher in order to trigger the comparator.

Alternatively, said receiver comprises one or more photodetectors arranged for transforming the electromagnetic radiation received in a first and a second received electric signal, and a first and a second variable gain amplification stage between a minimum gain $G_{min}$ and a maximum gain $G_{max}$ arranged for amplifying said first and said second electric signal, respectively; and where said detection circuit is arranged for processing said first and second received and amplified signal in order to emit a joint signal depending on said first and said second received and amplified signal, and comprising a comparator, wherein said comparator is arranged for comparing the joint signal with said detection threshold.

In sensors utilizing a PSD, two signals amplified by different chains are created, which are then processed to determine the distance at which the object is or is not present. In other words, the operation of the sensor is such that the operating distance, which is defined by the detection threshold, is set and the response of the sensor is whether the object "was detected or not" inside the set operating distance. Therefore the amplified signals are not compared directly with the detection threshold, but are first processed, for example being summed or subtracted, in order to then compute their ratio before emitting the response. Hence varying the threshold implies varying the operating distance of the sensor.

Preferably, the sensor includes two photo detectors.

Sensors utilizing two photodetectors are for example background or foreground suppressors (BGS or FGS), which are divided into electronic and mechanical based on the type of regulation. Alternatively, instead of two photo detectors, the background or foreground sensors may also include a PSD. Advantageously, said regulation element is configured such that a point in said regulation range is arranged to be selected by a user. In addition or alternatively, said sensor includes a processor, said processor being configured in order to select a point within said regulation range. The point defining the sensitivity within the regulation range can be set by the user, but also by a processor within the receiver in order to improve detection on the basis of the detection signals received, for example by using a hardware accelerator according to the first aspect of the invention. The processor can therefore, together or in place of the user, change the sensitivity of the sensor on the basis of measurements already performed.

Preferably, said detection threshold is a digital threshold.

Advantageously, said sensor includes an analog/digital converter arranged for converting said received and amplified signal into a digital signal.

In an exemplary embodiment, said emitter and receiver are positioned at a distance d and where said regulation element is so configured that said selected point within said regulation range is representative of the distance d. With asynchronous sensors, the distance between the emitter and receiver, said distance d, substantially "determines" the sensitivity of the sensor. The regulation element is therefore positioned at a value of sensitivity that is dependent upon this distance. The greater the distance, the greater the gain of the amplifier must be, and similarly, the threshold must be set according to the selected distance between the emitter and receiver, the threshold being a minimum amplitude threshold of the received and amplified signal in order to correctly receive a signal corresponding to a pulse from the emitter.

Preferably, said comparator is configured in such a way as to compare said detection threshold to an amplitude of the received and amplified signal. As mentioned above, preferably for asynchronous sensors, the detection threshold is a received and amplified signal amplitude threshold.

Alternatively, said detection threshold is a threshold that is indicative of an operating distance of said sensor. With distance sensors, for example including a PSD, the signal from two amplifier chains is received, amplified, processed, for example added, subtracted, and then a relationship between these two values is obtained, and the resulting value is then compared to the detection threshold. The comparison is used to determine whether an object is or is not within the operating distance that is set by determining the threshold value. The threshold therefore signifies an operating distance within which to determine whether or not an object is present.

Advantageously, the optoelectronic sensor according to the invention includes a linearization stage, said stage being configured in such a way as to associate with every point x within said regulation range of said regulation element a function f, such that at said position x within the regulation range there may be an associated sensitivity equal to f(x).

With the regulation of the sensitivity of the sensor it is preferable to have a linear regulation thereof, i.e. calling x the position within the regulation range of the sensor regulation element, the sensitivity function=mx+q. However, as noted, the intensity of the electromagnetic radiation emitted by the emitter decays with the square of the distance, wherein for example, calling d the distance between the transmitter and receiver (or between the receiver and a reflective object), the intensity decays as $1/d^2$. A "linearization" function is therefore applied to every value of x within the regulation range such that at the position x the sensitivity value s=f(x) may be linear. A parabolic function is necessary to compensate for this effect.

f(x) for a single asynchronous or synchronous sensor using a single photo diode with one processed signal could for example be $a+bx+cx^2$.

In the case of a distance sensor, there are two components to consider. There is not only the attenuation of the radiation intensity due to the distance from the object to be detected equal to d that follows the indicated law, but also a hyperbolic relationship 1/d due to the interaction of the beam emitted by the PSD sensor. In this case, it is preferable to have a hyperbolic linearization curve of the type $$f(x) = \frac{a}{x+b} + c.$$

According to a fifth aspect, the invention relates to a method of processing an electric signal that is a function of electromagnetic radiation emitted by the emitter of a optoelectronic sensor implemented according to the fourth aspect, said method including:

selecting in the regulation element a point within the j-th zone of the regulation range such as to regulate the gain of said amplification stage to a value equal to $G_j$ and a value of said detection threshold;

Emitting said electromagnetic radiation from said emitter;

Receiving electromagnetic radiation by said receiver during the emission of said electromagnetic radiation by said emitter;

generating an electric signal that is a function of said received radiation and amplifying the electric signal;

comparing said electric signal with said detection threshold; and

Determining whether said received amplified signal is indicative of the presence or absence of an object between the receiver and the emitter on the basis of said comparison.

According to a sixth aspect, the invention relates to a method of processing an electric signal that is a function of electromagnetic radiation emitted by an emitter of a optoelectronic sensor implemented according to the fourth aspect, said method including:

selecting in the regulation element a point within the j-th zone of the regulation range such as to regulate the gain of said amplification stage to a value equal to $G_j$ and a value of said detection threshold;

Emitting said electromagnetic radiation from said emitter;

Receiving electromagnetic radiation by said receiver during the emission of said electromagnetic radiation by said emitter;

generating a first and a second electric signal that are a function of said received radiation and amplifying the first and second electric signals;

processing said first and said second electric signal in order to generate a processed electric signal;

comparing said processed electric signal with said detection threshold; and

Determining whether said processed signal is indicative of the presence or absence of an object at a distance d acting upon the basis of said comparison.

The advantages of the fifth and sixth aspects of the invention were already outlined with reference to the fourth aspect and are not repeated here.

BRIEF DESCRIPTION OF THE DRAWINGS

These and additional advantages of the invention will become more evident from a detailed description with reference to the enclosed drawings, where:

FIGS. 2*a* and 2*b* show a simplified version of a optoelectronic sensor circuit according to the prior art and the second aspect of the invention of FIG. 1, respectively;

FIGS. 4*a* and 4*b* are two distinct preferred embodiments of a circuit of a portion of a optoelectronic sensor according to a second aspect of the invention;

FIGS. 5*a* and 5*b* are two frequency response graphs of the first stage in a first and a second operational configuration;

FIG. 9 shows a pulse signal emitted by the emitter of the optoelectronic sensor and an enable signal of the circuit 4*a* or 4*b*;

DETAILED DESCRIPTION OF EXAMPLE EMBODIMENTS

Figures 1, 3:
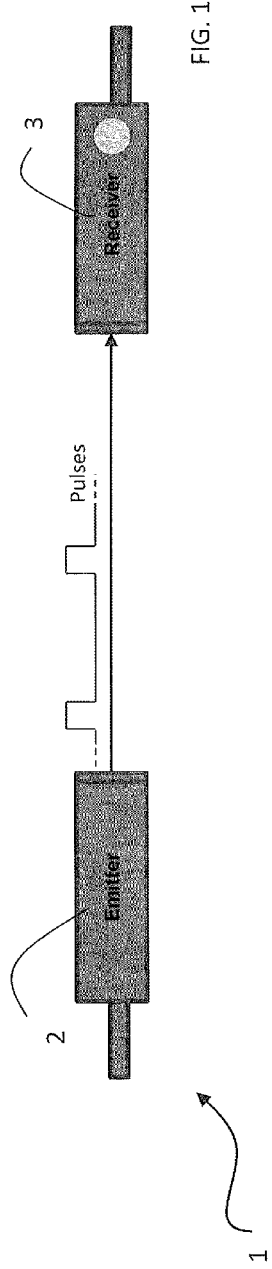
FIG. 1 is an exemplary schematic diagram of a optoelectronic sensor according to the invention.
FIG. 3 is a more detailed schematic diagram of the sensor of FIG. 2*b*.

In FIG. 1, where 1 denotes an electronic sensor according to the invention. The sensor 1 includes an emitter 2 arranged for emitting pulsed electromagnetic radiation and a receiver 3 arranged for receiving electromagnetic radiation and transforming it into an electric signal.

The emitter 2 preferably emits a pulse signal, as shown in FIG. 1. The emitter is driven in such a way as to preferably emit periodically, for example by a suitable driver 4 of a circuit 50, for example part of an integrated circuit, which defines the front-end of the circuit itself.

The front-end part 50 is detailed in FIGS. 2 and 3.

In addition, the circuit 50 includes a first and a second pin 5, 6 for the input of a first and a second signal from a first and a second photodiode (not shown). The first and second photodiodes are designed to receive electromagnetic radiation and to transform it into a first and second electric signal, inputted to the circuit via the pins 5 and 6. The first and second electric signals are amplified by a first and a second chain of amplifiers 7, 8, connected to pins 5 and 6, respectively. The two chains 7,8 are independent of one another, i.e. they are electrically separate and the first and second electric signals therein are not correlated. The first chain thus generates a first amplified signal and the second chain a second amplified signal.

The circuit 50 also includes an analog/digital converter 9 arranged for receiving as input the first and second amplified signals, thus transforming them into a first and a second digital signal.

The circuit 50 therefore includes a hardware accelerator 10, which receives as input the first and second digital signals from the analog/digital converter 9. The hardware accelerator performs all of the operations on the first and second digital signals in order to emit a processed identification signal for example regarding the detection or non-detection of an object. The accelerator 10 therefore preferably includes a block for the comparison of the input signals to one or more thresholds (block 11), a block for arithmetic operations on the signals (block 13), a block for generating a timing pulse in order to control the emitter driver (block 12). Furthermore, the hardware accelerator 10 can perform detection relating to diagnostics or else process the first and second signals received in such a way as to obtain information concerning the status of the amplification stages and/or of the photo diodes.

The hardware accelerator 10 is also configured in such a way as to emit one or more signals relating to diagnostic information and/or the detection. These signals are sent to a microcontroller 20, again part of the circuit 50. The microcontroller 20 receives these signals and is configured to possibly perform optional processing. Furthermore the microcontroller can set the width of the pulse signal emitted by the transmitter, the value of the thresholds for comparison with the digital signal within the hardware accelerator 10, and the gain of the amplification chains 5 and 6. These functions are part of the more general function of controlling and adjusting the sensitivity of the sensor 1, this function is performed by the microcontroller 20 in block 21. The gain of the chains is preferably set manually by the user my means of, for example, a trimmer 22 connected to the block 21.

In FIG. 2*a*, a comparison is made with a circuit according to the prior art. With the circuit according to the prior art, generally, all operations concerning the amplified signals relating to detection are performed by the microcontroller. This "centralized" management of the amplified signal operations generates a sensor response delay, a delay that is overcome by the invention.

With reference now to FIGS. 4*a* and 4*b*, a portion of an amplifier chain for amplifying the electric signal generated by the photodiode is shown. The chain can be part of the chains 7, 8 or it can be different. In the preferred example, FIG. 4*a* or 4*b* is considered to be a portion of the amplifier chain 7, amplifying an electric current signal generated by the photodiode current 30 in response to receiving light radiation and generating an output voltage signal Vout.

Typically the electromagnetic radiation received is in the form of pulses that the photodiode 30 can convert into current pulses. The portion of the chain 7 converts these pulses of current into a voltage signal Vout. The portion of amplifier chain 7 includes a first stage 31 which is connected to the photodiode 30. The first stage has the function of transforming the input current signal from the photodiode 30 and of emitting a corresponding voltage signal Vout. Preferably, it also has the function of amplifying the current signal, and more preferably it has the function of a transimpedance amplifier. The portion of the chain 7 also includes a second stage 32 the function of which is to monitor the output of the first stage Vout and to produce a feedback current that is dependent upon Vout. The feedback current is used to cancel at least part of the ambient noise sensor noise surrounding the sensor, in particular noise in the form of low-frequency components or the DC component of the signal produced by the photodiode 30. This cancellation attenuates the noise within the current signal. In general, the second feedback stage 32 preferably acts as an integrator with a high-pass filter response in order to convert the DC and low-frequency components of the output Vout into current components that are re-sent to the first stage in order to attenuate the current signal components from the photodiode 30 due to noise.

Further, according to the invention, the portion of the amplifier 7 includes a commutator 33, which is arranged for activating or deactivating the second stage 32. When the second stage is activated, it has the function described above, which is to emit a feedback current signal which is re-sent to the first stage in order to cancel the DC or low frequency components. When the second stage is deactivated, it no longer emits a feedback current but emits a substantially constant current output signal and preferably equal to the last value of the feedback current emitted before the commutator passed to the deactivation configuration.

The commutator 33 can for example be a square wave signal, tantamount an enable signal.

Passing from the activation configuration to the deactivation configuration changes the transfer function of the portion of the chain 7. FIG. 5*a* show the transfer function of the portion of the chain 7 when the commutator 33 is in the activation configuration of the second stage. The portion has a transfer function equal to that of a band-pass filter. With reference instead to FIG. 5*b*, when the commutator 33 is in the deactivation configuration, the transfer function is that of a low-pass filter.

In a preferred example of the invention, the transition from the activation configuration to the deactivation configuration occurs when the emitter emits electromagnetic radiation. As shown in FIG. 9, the electromagnetic radiation emitted by the emitter can for example be in the form of pulses with a duration Ton and separated from each other by a temporal distance Toff. The commutator 33 is therefore, according to the invention, in the activation configuration during the period Toff and in the deactivation configuration at the time Ton. The cycle is repeated for every emission of the emitter, thereby obtaining a system that dynamically changes from a band-pass to a low-pass amplifier and vice versa.

Figure 6A:
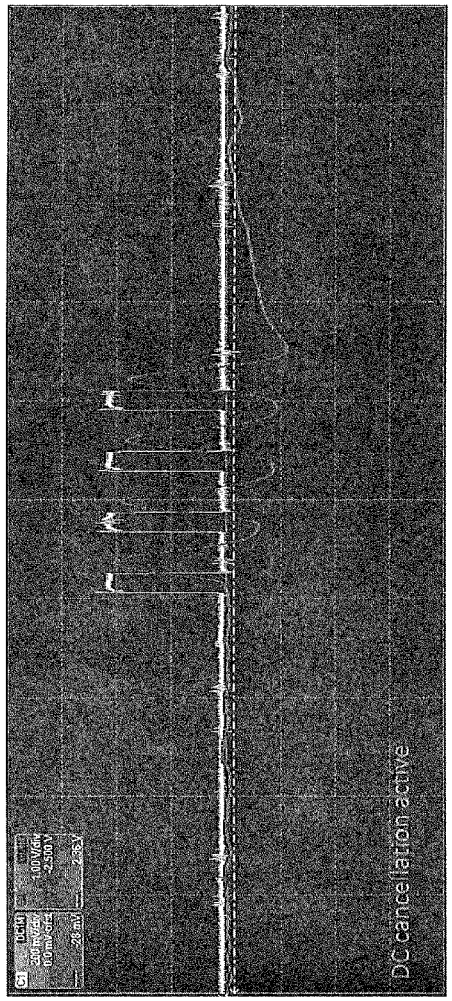
FIGS. 6*a* and 6*b* are two diagrams of an output signal from a circuit implemented according to the prior art and from the circuit of FIG. 4*a* or 4*b* when an emitter of the sensor emits a pulse train.
Figure 6B:
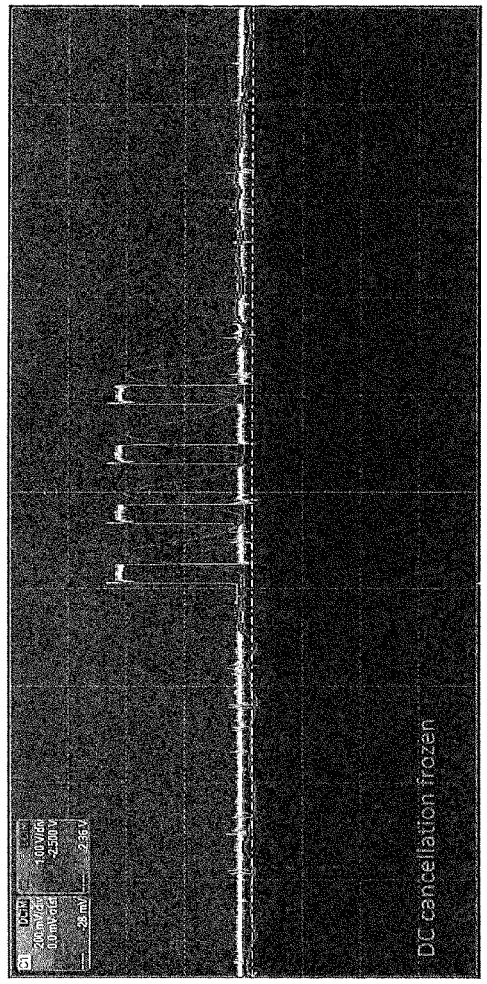

This commutation allows for both the effective cancellation of the noise and the good shaping of the received signal at the output Vout. To better appreciate this improved form of the signal, with reference to FIGS. 6*a* and 6*b*, a first case is presented, in which the emitter emits a pulse train, for example 4 pulses, spaced apart by 3 μs and each of 1 μs duration. The curve 6*a* represents the output signal from the amplifier chain 7 and 8 leaving the commutator 33 in the activation configuration. FIG. 6*b* instead shows the same output signal from the amplifier chains 7 and 8 but with the circuit of FIG. 4*a* or 4*b* operating according to the invention dynamically switching between the activation and deactivation configurations. As can be seen, evaluating the amplitude and the encoding sequence of the signal of FIG. 6*a* can pose some problems. Firstly, the amplitude of the last pulse may be below a predetermined threshold and may therefore not be detected. This is due to the fact that the averaged signal is null, which means that the peak value of these pulses depends upon the previously received signal. In fact, without the DC component within the signal, the temporal component of the signal has a null average. It may therefore be necessary to make changes to the system in order to correctly evaluate this signal, for example expanding the width of the analog/digital converter window 9. Instead the signal of FIG. 6b does not pose any of these problems and is easily processed.

Figure 7A:
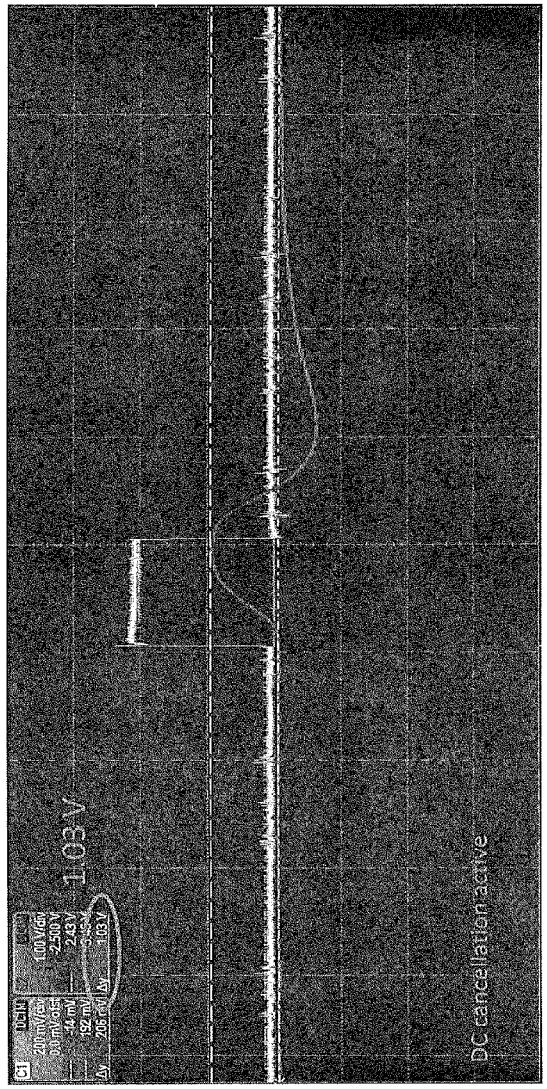
FIGS. 7*a* and 7*b* are two diagrams of an output signal from a circuit implemented according to the prior art and from the circuit of FIG. 4*a* or 4*b* when an emitter of the sensor emits a single pulse.
Figure 7B:
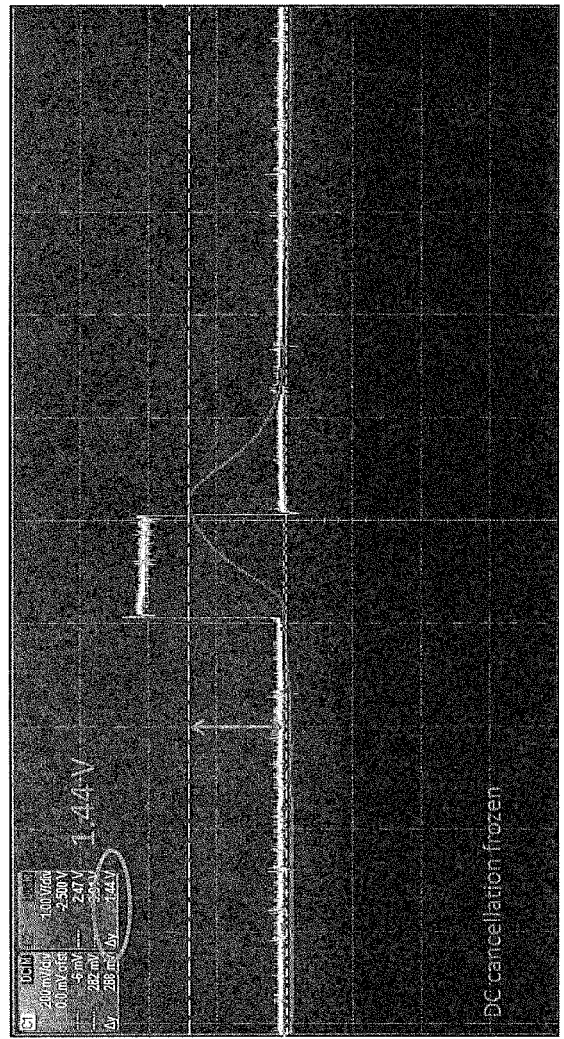
Figure 8A:
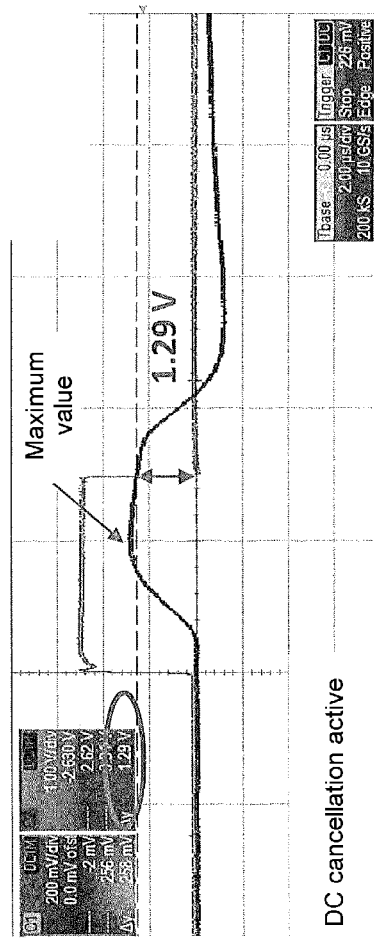
FIGS. 8*a* and 8*b* correspond to FIGS. 7*a* and 7*b*, with explanatory notes.
Figure 8B:
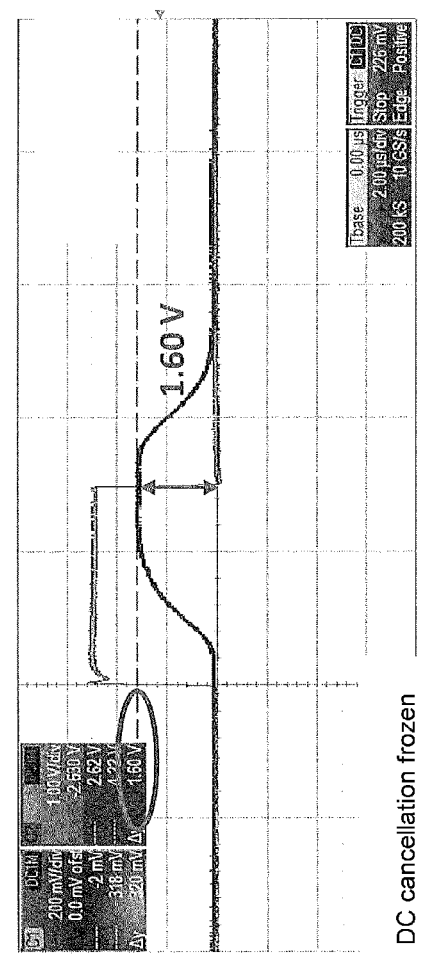

FIGS. 7a and 7b show a second case in which the emitter emits a single pulse with a duration of 5 μs. The curve 7a represents the output signal from the amplifier chain 7 and 8 leaving the commutator 33 in the activation configuration. FIG. 7b instead shows the same output signal from the amplifier chains 7 and 8 but with the circuit of FIG. 4a or 4b operating according to the invention dynamically commutating between the activation and deactivation configurations. With the signal of FIG. 7a, it may be difficult to synchronize the sampling of the analog/digital converter with the maximum value of the received signal. Observing FIG. 8a which corresponds to FIG. 7a, the value of the output signal from the amplifier chains 7 and 8 at the instant in time in which the pulse of the signal emitted by the emitter drops to 0 (see the pulse signal from the emitter superimposed on the output signals from the amplifier chains in FIGS. 8a and 8b) does not correspond with the maximum value of the output signal from the amplifier chains (the value at the time in which the emitted pulse returns to zero corresponds to a output signal value of 1.29 V). The time position of this maximum output signal depends on many parameters such as the gain, the temperature, etc., and therefore in order to obtain good synchronization it is generally necessary to add a peak detector to the circuit 50 which, however, increases the consumption of the circuit itself, makes it more complex and reduces the response time of the sensor. The signal of FIG. 7b, as highlighted in its elaboration in FIG. 8b where it is superimposed onto the emission signal, is at its maximum when the emission signal returns to 0. This facilitates the synchronization. Additionally, the maximum amplitude of the output signal is greater with the proposed dynamic commutation.

In FIG. 4a, an exemplary embodiment of the circuit of FIG. 4b is proposed. The first stage 31 includes a transimpedance operational amplifier 311 (TIA). A first input of the operational amplifier 311 is connected to the photodiode 30, while the other input is set to a fixed reference voltage Vref. The output of the operational amplifier 311 is the output Vout of the entire circuit. The first input and the output are connected together via a resistor 312 and a capacitor 313 in parallel. The second feedback stage 32 includes a transconductance operational amplifier 321 (OTA) a first input of which is connected to the output of the first stage, i.e. to the output of the operational amplifier 311 and a second input is connected to the reference voltage Vref. A third input of the operational transconductance 321 is connected to the commutator 33, i.e. it receives an enable signal. A capacitor 322 is connected between the output of the op amp 321 and earth. The transconductance amplifier 321 and capacitor 322 together form an integrator for generating feedback at the output Vout, when the commutator is in the activation configuration. The second stage 32 also includes a MOSFET 323 the gate of which is connected to the output of the transconductance amplifier 321, the source is connected to ground through a resistor and the drain is connected to the output of the photodiode 30.

In operation, with the commutator in the activation configuration (with the enable signal "high") given that there is no signal from the emitter, the circuit of FIG. 4a processes the current signals from the photodiode 30 producing an output voltage Vout. The first stage 31 functions as a transimpedance amplifier with a certain gain. The transconductance amplifier 321 and the capacitor 322 couple a feedback current generated by means of the MOSFET 323. The transconductance amplifier 321 monitors the output Vout of the first stage 31 and compares it to the same reference Vref used by the first stage. The transconductance amplifier 321 operates to take the difference between the two values to zero thereby producing a negative feedback current. Any signal having a frequency lower than the cutoff frequency of the second stage 32 is attenuated. Higher frequency signals can pass through because the second stage 32 cannot react quickly enough to cancel the signal. The transconductance amplifier 321 is configured to produce a feedback current for low frequency or DC components.

When the enable signal dynamically switches to "low", i.e. the commutator is moved to the deactivation configuration because a pulse as been emitted by the emitter, the transconductance amplifier 321 does not emit any more current. The terminals of the capacitor 322 therefore remain at the same voltage as before switching off the amplifier 321.

In fact the OTA 321 charges the capacitor 322 according to the output signal from the first stage. The voltage across the capacitor drives the MOSFET 323 such as to subtract more or less current from the TIA 311. When the commutator commutates to non-activation, the OTA is deactivated by means of the ENABLE pin, the capacitor 322 keeps the value constant, and the MOSFET 323 continues to drain a constant current away the input to the TIA 311. Given that the noise is low frequency noise, even though the value to be canceled is not updated for a short period of time (short with respect to the period within which the noise can vary) cancellation of the same nonetheless takes place, i.e during the deactivation period the low frequency noise does not have time to change.

Figure 11:
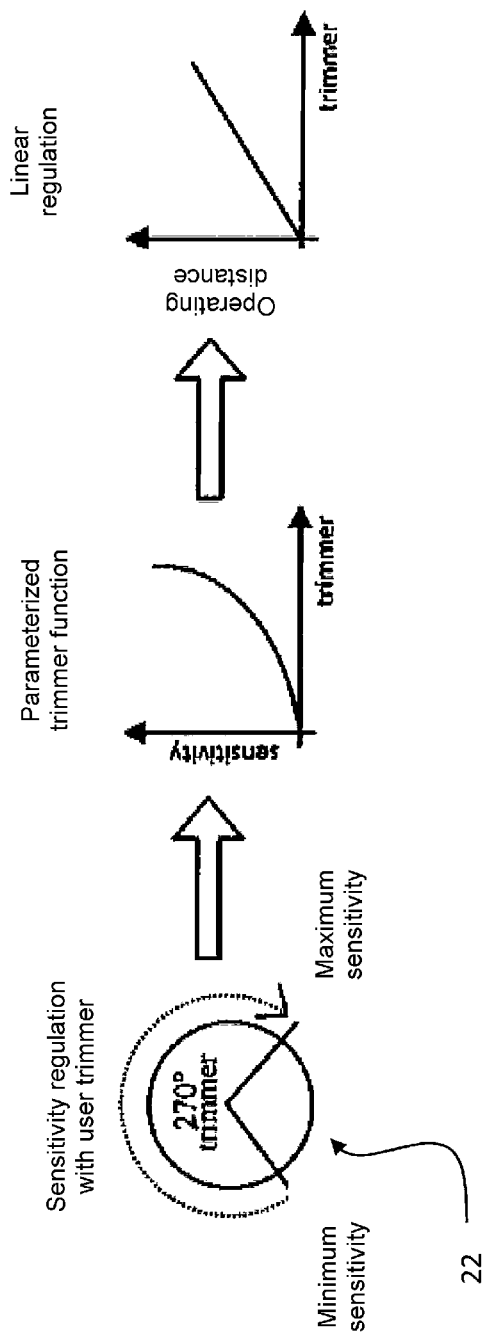
FIG. 11 represents a schematic example of the linearization procedure.

With reference to the sensor 1 represented in FIG. 3, the regulation of the sensitivity of a optoelectronic sensor 1 according to the invention is now described. This regulation can be applied to an optoelectronic sensor 1 with the circuit 50 wherein there is a single photo detector 30, two photo detectors or a PSD, which generate one or two current signals which are then optionally converted into a voltage signal for example by the first stage 31 of FIG. 4a or 4b and then amplified by one or two amplifier chains 7 or 8. The sensitivity of the sensor is controlled by a trimmer, for example the trimmer 22. The trimmer is connected to the microcontroller 20 that controls the gain of the chain 7, 8 together with the detection threshold value of the detector circuit, in this case the hardware accelerator 10. The trimmer 22 has a regulation range (shown in FIG. 11) divided into a plurality of m intervals or zones. Each interval or zone corresponds to a gain value G of the analog chain 7,8 that is constant for the entire interval (in other words, during the same interval, whatever point is selected, the gain is always the same). Contiguous intervals have a gain change equal to a value a that is preset, for example within the microcontroller 20. Instead of passing from one end to the other of the interval, i.e. by moving from one of its end points to the other, the hardware accelerator 10 threshold value is continuously varied from a maximum to a minimum. The location of the maximum and of the minimum corresponds respectively to the start point (i.e. to the point of contact with the previous interval) and the end point (i.e. to the point of contact with the next interval) of the interval. For example, for a desired dynamic D equal to 1000 it is supposed that 1000 points are necessary within which a value of sensitivity can be selected. In this preferred example a factor α equal to 2 is selected.

The value of 1000 can thus be divided into 11 intervals by applying the progression $$G_j = \alpha G_{j-1}$$

With α equal to two. The intervals 11 into which the regulation range is divided thus each have a constant gain corresponding to one of the values:

($G_{min}=G_1=1$; $G_2=2*G_1=2$; $G_3=2*G_2=4$; $G_4=2*G_3=8$; $G_5=2*G_4=16$; ... ; $G_{max}=G_m=G_{11}=2^{19*}G_1=1024$) to cover the entire interval from $G_{min}=1$ up to $G_{max}=1024*G_{min}$.

Considering now an asynchronous or synchronous type single photodiode sensor, the detection threshold is a threshold set to the amplitude value of the received and amplified signal, which is a voltage signal, for which the threshold is a voltage value with which the signal should be compared. The minimum detection threshold can be chosen such that it is equal for example to 500 mV and the threshold can then be varied for each regulation range interval from minimum value of 500 mV to a maximum value 500 mV*α=1 V. For example, using an analog/digital converter 9 that carries out a 10-bit digital conversion on the received and amplified analog signal, with an interval of 5 V it is possible to obtain a digital resolution of ~5 m V/bit within the AD converter (5 V/1024 bit).

Thus, for each interval, or zone, of the trimmer 22 regulation range, it is possible to have 100 threshold steps, i.e. for every zone there are 100 points of varying sensitivity $$\frac{(1 \text{ V} - 500 \text{ mV})}{5 \text{ mV/bit}} = 100$$

Using only 11 distinct gain intervals joined two by two by 100 distinct threshold points, more than 1000 points of global sensitivity are obtained by means of the simple calculation Number of points of varying sensitivity=number of gain intervals*number of threshold steps=11*100=1100

In this way, therefore, a complexity of the analog part is considerably reduced and moved to the digital part.

The number of points present for each interval relative to the threshold value can easily be modified according to the application of the sensor used, simply by means of varying a digital value.

Figure 10A:
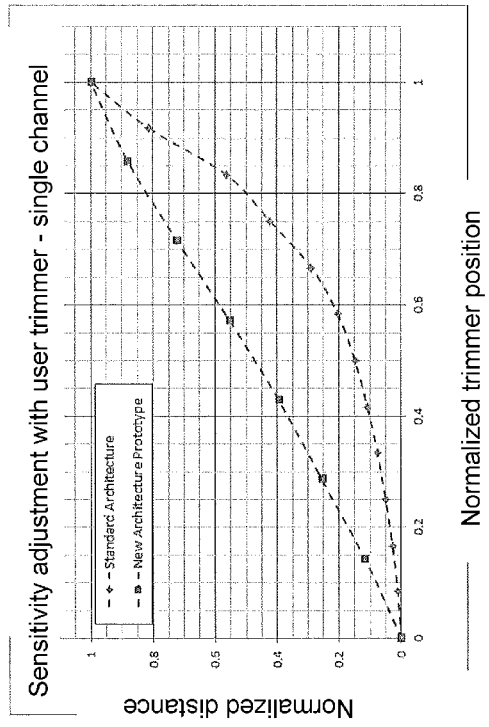
FIGS. 10*a* and 10*b* represent a first and a second graph of a linearization operation of the regulation range of the sensor in a first and a second preferred sensor example, respectively.
Figure 10B:
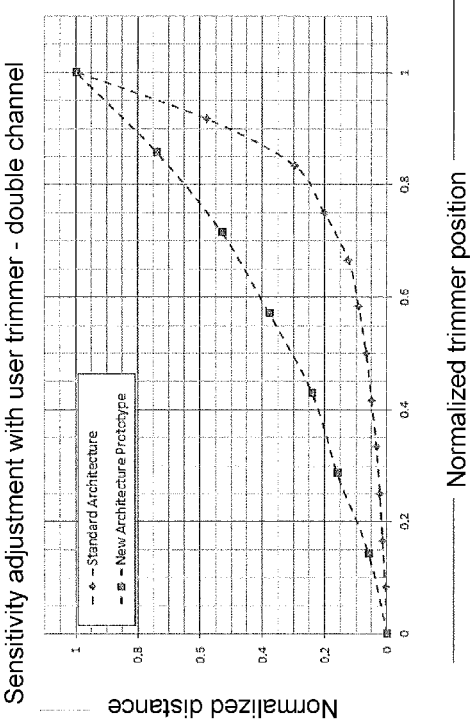

FIGS. 10a, 10b present two examples of linearization of the output signal from the trimmer 22, relative to the position of the trimmer in the regulation range. The operation performed is that exemplified in FIG. 11, i.e. the regulation point x selected within the regulation range of the trimmer 22 corresponds to a sensitivity value of s. The curve corresponding to the trimmer sensitivity/position is not linear but is, depending upon the type of sensor used, generally a polynomial curve. The sensor advantageously includes a linearization stage, for example, internal to the microcontroller 20, that applies a linearization function to the value of the point x such that the output value from the microcontroller 20 at the position x on the trimmer generates a linear function.

In a sensor with a single chain of amplifiers in use, i.e a single received and processed signal, this linearization involves the transition from the bottom curve (curve obtained without linearization) to the top curve of FIG. 10a. The linearization is obtained by means of a parabolic function. A different linearization is used for a distance sensor with a PSD sensor and a graph similar to FIG. 10a is reported in FIG. 10b where the linearization was carried out using a hyperbolic function.

The invention claimed is:

1. An optoelectronic sensor including:
   an emitter arranged for emitting periodic pulsed electromagnetic radiation; and
   a receiver arranged for receiving an electromagnetic radiation, said receiver comprising:
      a photodetector arranged for receiving an electromagnetic radiation and for transforming the electromagnetic radiation into a current electric signal;
      an amplifier comprising:
         a first stage having the current signal as an input and configured to convert the current signal into a voltage signal and to provide the voltage signal on an output ($V_{out}$);
         a second feedback stage arranged for receiving the voltage signal output from said first stage at its input ($V_{out}$) and to provide a feedback current signal as output arranged for summing to the current signal of the photodetector introduced into said first stage in order to cancel from the output voltage signal emitted from said first stage the contributions of the low frequency components of the current signal of the photodetector; and
         a commutator connected to said second stage arranged for activating or not said second stage, which can be moved into an activation configuration, wherein said second stage emits the feedback current and into a non-activation configuration, wherein said second stage emits a substantially constant current.

2. The optoelectronic sensor according to claim 1, wherein said commutator is configured to be movable in the activation configuration when no electromagnetic radiation is emitted by the emitter.

3. The optoelectronic sensor according to claim 1, wherein said commutator is configured to be moved into the non-activation configuration when said emitter emits a pulse of electromagnetic radiation.

4. The optoelectronic sensor according to claim 1, wherein the constant current is equal to the feedback current at the instant previous to the emission of the pulse.

5. The optoelectronic circuit, according to claim 1, wherein said first stage includes a transimpedence amplifier, said transimpedance amplifier receiving the current signal from the photodetector as input and emitting the output voltage signal as output ($V_{out}$).

6. The optoelectronic sensor according to claim 1, wherein said second stage includes a transconductance amplifier, said transconductance amplifier receiving the output voltage signal of said first stage as input and emitting a current signal utilized to generate the feedback current as output.

7. A method for canceling the noise signal in an optoelectronic sensor, said method comprising:
   receiving an electromagnetic radiation;
   transforming the electromagnetic radiation into a first current signal;
   when the electromagnetic radiation is received while a pulse signal is not being emitted:
      transforming the current signal into a voltage signal in a first stage;

generating a feedback current signal as a function of the voltage signal;
adding the feedback current signal to the first current signal to generate an input result signal; and
entering the input result signal to the first stage in order to cancel the contributions of the low frequency components of the first current signal in the voltage signal emitted by the first stage;
when said electromagnetic radiation is received while emitting a pulse signal:
transforming the current signal into a voltage signal in a first stage;
emitting a constant current signal;
adding the constant current signal to the first current signal; and
entering the input result signal to the first stage.

8. The method according to claim 7, further comprising:
determining a feedback current before the emission of the pulse;
emitting the pulse;
determining the emission of the pulse, emitting a constant current signal equal to said measured feedback current and adding the constant current signal to the first current signal.

9. The optoelectronic sensor of claim 1, wherein said commutator includes an enable signal.

10. The optoelectronic sensor of claim 9, wherein said enable signal is an input to the amplifier.

11. The optoelectronic sensor of claim 1, wherein said receiver further comprises a regulation element configured to regulate the sensitivity of the sensor having a regulation range subdivided into a number of consecutive zones m.

12. The optoelectronic sensor of claim 11, wherein a first zone relates to a sensor sensitivity starting from the minimum usable sensitivity for the optoelectronic sensor and an m-th zone relates to a sensitivity terminating at a maximum usable sensitivity for the optoelectronic sensor.

13. The optoelectronic sensor of claim 12, wherein a variable gain of said amplifier stage is selected by selecting a point in a zone of the regulation range of the regulation element.

14. The optoelectronic sensor of claim 13, wherein the regulation range is implemented in a manner so that for every point in each zone j of the regulation range, the selected gain is constant and equal to:

$$G_j = \alpha G_{j-1}$$

where $G_{max} = G_m = \alpha^m G_1 = \alpha^{m-1} G_1$ and $\alpha$ is a predetermined number greater than zero; and the regulation range being configured in a manner that by moving a selected point in said regulation range inside the j-th zone in the direction from the starting point adjacent to the (j−1)-th zone towards the end point adjacent to the (j+1)-th zone, the corresponding detection threshold set in the detection circuit is moved from the maximum threshold that can be set to the minimum threshold that can be set, where the maximum threshold that can be set is equal to the minimum threshold that can be set multiplied by the number $\alpha$.

15. The optoelectronic sensor of claim 1, further comprising a detector circuit arranged to process the received and amplified electric signal and to compare the received, amplified, and processed electric signal with a detection threshold.

16. The optoelectronic sensor of claim 15, wherein said detection circuit comprises a comparator downstream of said amplifier, said comparator being arranged to compare the received and amplified electric signal with the detection threshold in order to establish whether an object was detected or not.

17. The optoelectronic sensor of claim 16, wherein the comparator is configured in such a way as to compare the detection threshold with an amplitude of the received and amplified signal.

18. The optoelectronic sensor of claim 11, wherein said emitter and said receiver are positioned at a distance d and where said regulation element is so configured that selected point within said regulation range is representative of the distance d.

19. The optoelectronic sensor of claim 15, wherein said detection threshold is a threshold that is indicative of an operating distance of said sensor.

20. The optoelectronic sensor of claim 11, further including a linearization stage, said stage being configured in such a way as to associate with every point x within the regulation range of said regulation element a function f, such that to the position x within the regulation range is associated a sensitivity equal to f(x).

* * * * *